(12) United States Patent
Kawaguchi et al.

(10) Patent No.: US 7,345,849 B2
(45) Date of Patent: Mar. 18, 2008

(54) MAGNETIC HEAD SLIDER MATERIAL, MAGNETIC HEAD SLIDER, AND METHOD OF MANUFACTURING MAGNETIC HEAD SLIDER MATERIAL

(75) Inventors: Yukio Kawaguchi, Tokyo (JP); Kei Sugiura, Tokyo (JP); Masahiro Itoh, Tokyo (JP); Minoru Sakurabayashi, Tokyo (JP); Atsushi Hitomi, Tokyo (JP); Cheng Yih Liu, Hong Kong (CN)

(73) Assignees: TDK Corporation, Tokyo (JP); SAE Magnetics (H.K.) Ltd., Shatin (HK)

( * ) Notice: Subject to any disclaimer, the term of this patent is extended or adjusted under 35 U.S.C. 154(b) by 402 days.

(21) Appl. No.: 11/166,266

(22) Filed: Jun. 27, 2005

(65) Prior Publication Data

US 2006/0002027 A1  Jan. 5, 2006

(30) Foreign Application Priority Data

Jun. 30, 2004 (JP) .............................. 2004-194627

(51) Int. Cl.
*G11B 5/127* (2006.01)
*G11B 5/60* (2006.01)
*C04B 35/10* (2006.01)
*C04B 35/56* (2006.01)
*C04B 35/00* (2006.01)

(52) U.S. Cl. ............................ 360/235.3; 360/235.1; 501/89; 501/87; 501/88; 501/90; 501/93; 264/29.1

(58) Field of Classification Search .................. 501/89, 501/87, 88, 90, 93; 264/29.1, DIG. 36; 360/235.3, 360/235.1
See application file for complete search history.

(56) References Cited

U.S. PATENT DOCUMENTS

| | | | | | |
|---|---|---|---|---|---|
| 4,681,813 | A | * | 7/1987 | Yamada et al. | 428/450 |
| 4,859,638 | A | * | 8/1989 | Wada et al. | 501/88 |
| 4,958,998 | A | * | 9/1990 | Yamauchi et al. | 423/445 R |
| 5,075,264 | A | * | 12/1991 | Kinugasa et al. | 501/88 |
| 5,656,213 | A | * | 8/1997 | Sakaguchi et al. | 264/29.7 |
| 6,437,943 | B1 | * | 8/2002 | Yokote et al. | 360/235.3 |

FOREIGN PATENT DOCUMENTS

| | | |
|---|---|---|
| JP | A 57-82172 | 5/1982 |
| JP | A-63-170257 | 7/1988 |
| JP | A-63-208208 | 8/1988 |
| JP | A-05-254938 | 10/1993 |
| JP | B2-2625505 | 4/1997 |

* cited by examiner

Primary Examiner—William J Klimowicz
(74) Attorney, Agent, or Firm—Oliff & Berridge, PLC

(57) ABSTRACT

The magnetic head slider material of the present invention is constituted by a sintered body containing 100 parts by weight of alumina, 20 to 150 parts by weight of titanium carbide and silicon carbide in total, and 0.2 to 9 parts by weight of carbon.

14 Claims, 5 Drawing Sheets

Fig.4
(a)
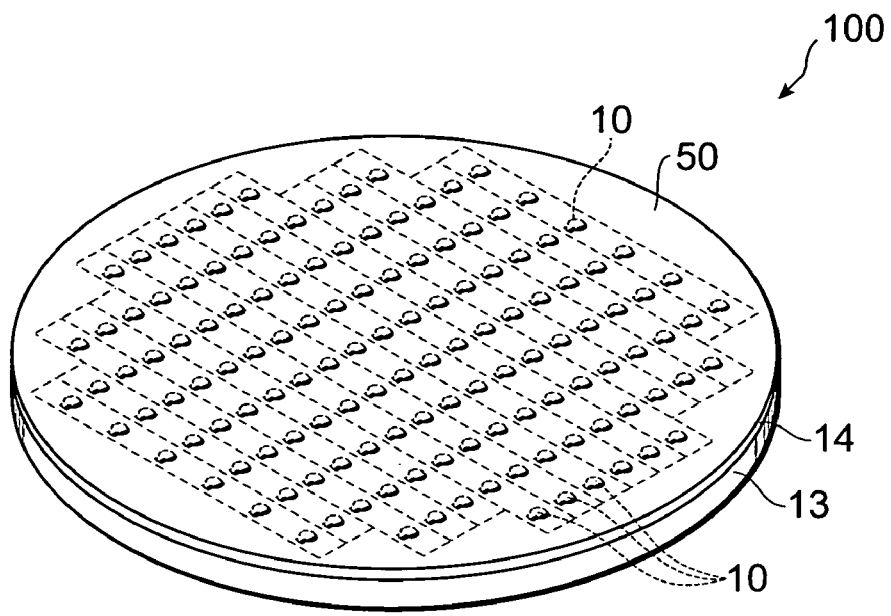
(b)
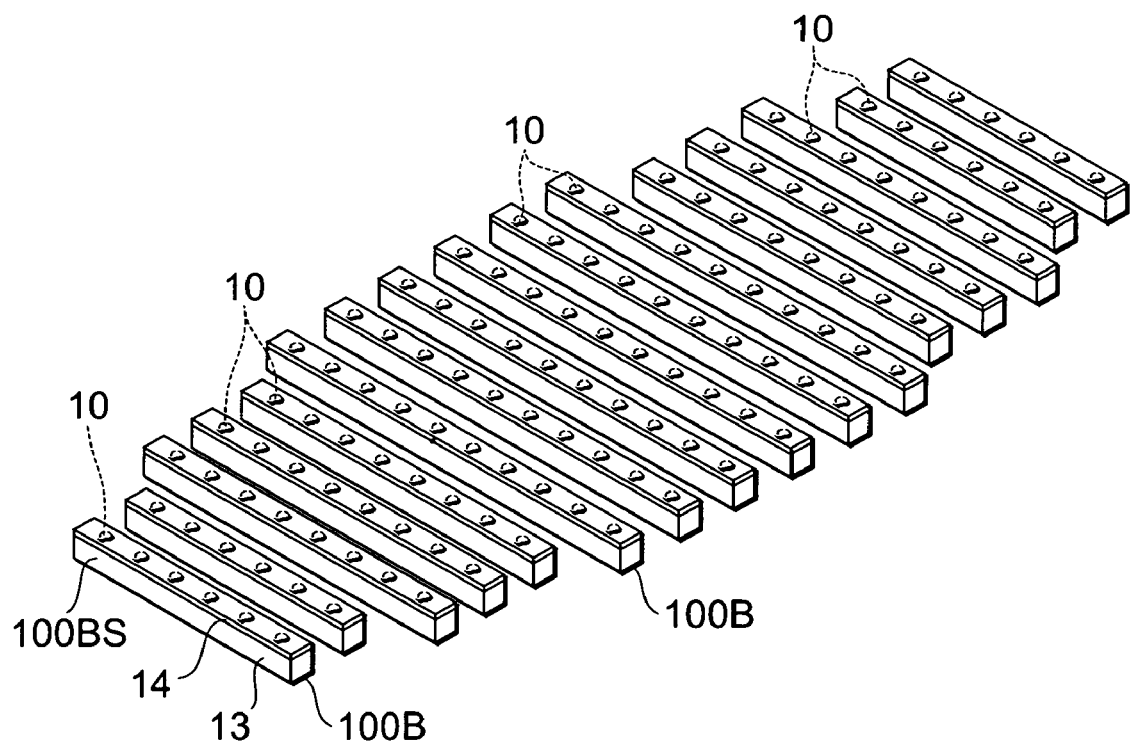

MAGNETIC HEAD SLIDER MATERIAL, MAGNETIC HEAD SLIDER, AND METHOD OF MANUFACTURING MAGNETIC HEAD SLIDER MATERIAL

BACKGROUND OF THE INVENTION

1. Field of the Invention

The present invention relates to a magnetic head slider material, a magnetic head slider, and a method of manufacturing a magnetic head slider material.

2. Related Background Art

A magnetic head slider including a thin-film magnetic head came into use in hard disk drives for the first time in 1979. The magnetic head slider at that time has been referred to as "mini slider" (100% slider) in general. Thereafter, magnetic head sliders have been reducing their size so as to become "nano slider" (50% slider) whose size is about 50% that of the mini slider by way of "micro slider" (70% slider) whose size is about 70% that of the mini slider.

In general, the magnetic head slider comprises a laminate, disposed on a substrate, including a thin-film magnetic head. Such a magnetic head slider is obtained by the steps of stacking a laminate including a thin-film magnetic head on a substrate so as to yield a laminate structure; then cutting the laminate structure in parallel with the laminating direction, so as to form an exposed surface of the thin-film magnetic head; and lapping (grinding) the exposed surface, so as to yield an air bearing surface.

When manufacturing a conventional magnetic head slider, a sintered body having a high strength mainly composed of alumina and titanium carbide, i.e., so-called AlTiC sintered body, has been employed as a substrate of the magnetic head slider as disclosed in the following Patent Document 1, for example.

[Patent Document 1] Japanese Patent Application Laid-Open No. SHO 57-82172

SUMMARY OF THE INVENTION

Currently, a magnetic head slider referred to as "pico slider" (30% slider) whose size is about 30% that of the mini slider has become mainstream. As hard disk drives cut down their size and cost, magnetic head sliders are expected to become smaller from now on, so as to shift to "femto slider" (20% slider), whose size is about 20% that of the mini slider, in future.

As the magnetic head sliders become smaller, differences in level in the air bearing surface which are caused by the difference in the amount of grinding between the substrate and the laminate stacked on the substrate are required to be reduced in the lapping step at the time of forming the air bearing surface.

Also, when the thin-film magnetic head operates, a write current is supplied thereto during the process of writing, and a read current is supplied thereto during the process of reading, whereby the thin film part of the thin-film magnetic head is heated. In the writing process, the heat generated by the write current expands the thin-film part, thereby causing the thin-film part to become convex. Such a deformation may reduce the clearance from the medium too much, thereby generating crashes. On the other hand, the heat generated by the read current may affect the life of head functions.

For reducing such influences of the heat at the time of energization and yielding a high reliability, magnetic head sliders are required to improve their heat dissipation property.

In view of the problems mentioned above, it is an object of the present invention to provide a magnetic head slider material which can reduce differences in level in the air bearing surface while having a sufficient strength and a sufficient heat dissipation property, a magnetic head slider using the same, and a method of manufacturing a magnetic head slider material.

The inventors conducted diligent studies and, as a result, have found that the grinding speed of the AlTiC sintered body employed as the substrate of conventional magnetic head sliders is much lower than that of the laminate including the thin-film magnetic head, which makes the amount of grinding of the laminate much greater than the amount of grinding of the substrate at the time of lapping, thereby yielding a large difference in level. The inventors have further found that the grinding speed of a sintered body having a predetermined composition including alumina, titanium carbide, silicon carbide, and carbon becomes sufficiently higher than that of the conventional AlTiC sintered body while having a sufficient strength and a high thermal conductivity, thereby achieving the present invention.

In one aspect, the present invention provides a magnetic head slider material constituted by a sintered body containing 100 parts by weight of alumina, 20 to 150 parts by weight of titanium carbide and silicon carbide in total, and 0.2 to 9 parts by weight of carbon.

In another aspect, the present invention provides a magnetic head slider comprising a substrate made of a sintered body; and a laminate, formed on the substrate, including a thin-film magnetic head. The sintered body contains 100 parts by weight of alumina, 20 to 150 parts by weight of titanium carbide and silicon carbide in total, and 0.2 to 9 parts by weight of carbon.

In these aspects of the present invention, the sintered body has a grinding speed faster than that of the AlTiC sintered body used in conventional magnetic head slider materials, so that the difference between the grinding speed of a substrate using this magnetic head slider material and that of the laminate including the thin-film magnetic head becomes sufficiently smaller than the conventional difference. As a consequence, differences in level are less likely to occur between the laminate and substrate in the air bearing surface formed by lapping at the time of manufacturing the magnetic head slider, more specifically, at the time of manufacturing the magnetic head slider by stacking a laminate including a thin-film magnetic head on a substrate made of the magnetic head slider material, so as to yield a laminate structure, and then lapping a cross section of the laminate structure parallel to the laminating direction thereof. On the other hand, this magnetic head slider material has a sufficient strength and a sufficient heat dissipation property, and thus can yield a magnetic head slider having an excellent reliability. Further, the high thermal conductivity of the magnetic head slider material in accordance with the present invention can radiate the heat generated at the head out of the system efficiently, and thus the thickness of the oxide (e.g., alumina) film forming the undercoat for the thin film part of the thin-film magnetic head can be reduced. As a consequence, the present invention is effective in improving the productivity of the thin-film magnetic head and makes it easy to control the temperature of the substrate material in the film forming step in vacuum or under reduced pressure.

When the carbon content is less than 0.2 part by weight in the sintered body in the magnetic head slider material and magnetic head slider in accordance with the present invention, the grinding speed does not become sufficiently higher than that of the substrate made of the conventional AlTiC sintered body. On the other hand, the strength decreases when the carbon content in the sintered body exceeds 9 parts by weight.

The reason why the grinding speed of the magnetic head slider material becomes higher as the carbon content increases is not clear, but may be presumed as follows, for example. Namely, it seems that, when carbon is added to a sintered body containing alumina, titanium carbide, and silicon carbide, particles of alumina, titanium carbide, and silicon carbide are restrained from growing at the time of sintering, whereby the grinding speed of the sintered body increases.

The sintered body contains silicon carbide, thereby improving the thermal conductivity and yielding a sufficient heat dissipation property.

When the content of titanium carbide and silicon carbide in total in the sintered body is less than 20 parts by weight with respect to 100 parts by weight of alumina in the magnetic head slider material and magnetic head slider in accordance with the present invention, the rigidity of the material is lowered, whereby the strength decreases. When the content of titanium carbide and silicon carbide in total in the sintered body exceeds 150 parts by weight, on the other hand, the sintering property is lowered, whereby the strength decreases.

Therefore, since the sintered body contains 100 parts by weight of alumina, 20 to 150 parts by weight of titanium carbide and silicon carbide in total, and 0.2 to 9 parts by weight of carbon, the magnetic head slider material and magnetic head slider in accordance with the present invention can satisfy all of the high grinding speed, high strength, and sufficient heat dissipation property at the same time.

Preferably, in the magnetic head slider material and magnetic head slider, the sintered body contains 0.3 to 6 parts by weight of carbon, more preferably 0.5 to 3 parts by weight of carbon, with respect to 100 parts by weight of alumina. In this case, a high grinding speed and a high strength can simultaneously be attained at a sufficient level.

Preferably, in the magnetic head slider material and magnetic head slider, the sintered body contains 10 to 90 parts by weight of silicon carbide with respect to 100 parts by weight of alumina. When the silicon carbide content is less than 10 parts by weight, a sufficient thermal conductivity is harder to attain in the material, whereby the heat dissipation property of the magnetic head slider tends to become insufficient. When the silicon carbide content exceeds 90 parts by weight, on the other hand, the thermal expansion coefficient of the material tends to decrease. If the difference in thermal expansion coefficient between the material and the thin-film part becomes remarkable, differences in level are likely to occur between the substrate and alumina undercoat film when the magnetic head is in use.

Preferably, in the magnetic head slider material and magnetic head slider, the sintered body contains at least 35 parts by weight of titanium carbide with respect to 100 parts by weight of alumina. This allows the material to improve its electric resistance, thereby making it easier to attain the antistatic effect.

Preferably, in the magnetic head slider material and magnetic head slider, the sintered body further contains 0.5 to 10 parts by weight of titania with respect to 100 parts by weight of alumina. This allows the sintered body to improves its sintering property, and makes it easier to enhance the strength.

In still another aspect, the present invention provides a method of manufacturing a magnetic head slider material, the method comprising the steps of preparing a powder molded body, and sintering the molded body in a non-oxidizing atmosphere. The powder molded body contains 100 parts by weight of alumina, 20 to 150 parts by weight of titanium carbide and silicon carbide in total, and 0.2 to 9 parts by weight of carbon.

This can favorably manufacture the above-mentioned magnetic head slider material.

The step of preparing the molded body may mix a powder containing alumina, a powder containing titanium carbide, a powder containing silicon carbide, and a powder containing carbon so as to yield a mixed powder, and mold the mixed powder.

The step of preparing the molded body may mix a powder containing alumina, a powder containing titanium carbide, a powder containing silicon carbide, and an organic matter so as to yield a mixture, heat-treat the mixture in the non-oxidizing atmosphere so as to carbonize the organic matter in the mixture and yield a mixed powder, and mold the mixed powder.

The step of preparing the molded body may mix a powder containing alumina, a powder containing titanium carbide, a powder containing silicon carbide, and an organic matter so as to yield a mixture, mold the mixture, and heat-treat the molded mixture in the non-oxidizing atmosphere so as to carbonize the organic matter in the mixture.

BRIEF DESCRIPTION OF THE DRAWINGS

FIG. 1 is a perspective view of the magnetic head slider in accordance with an embodiment of the present invention;

FIG. 2 is a sectional view of the magnetic head slider taken along the line II-II of FIG. 1;

FIG. 3 is a perspective view for explaining the method of manufacturing a magnetic head slider in accordance with an embodiment of the present invention;

[FIG. 4](a) and (b) in FIG. 4 are perspective views, subsequent to FIG. 3, for explaining the method of manufacturing a magnetic head slider in accordance with the embodiment of the present invention; and

FIG. 5 is a schematic sectional view showing a state where a bar of (b) in FIG. 4 is ground.

DESCRIPTION OF THE PREFERRED EMBODIMENTS

Figure 1:
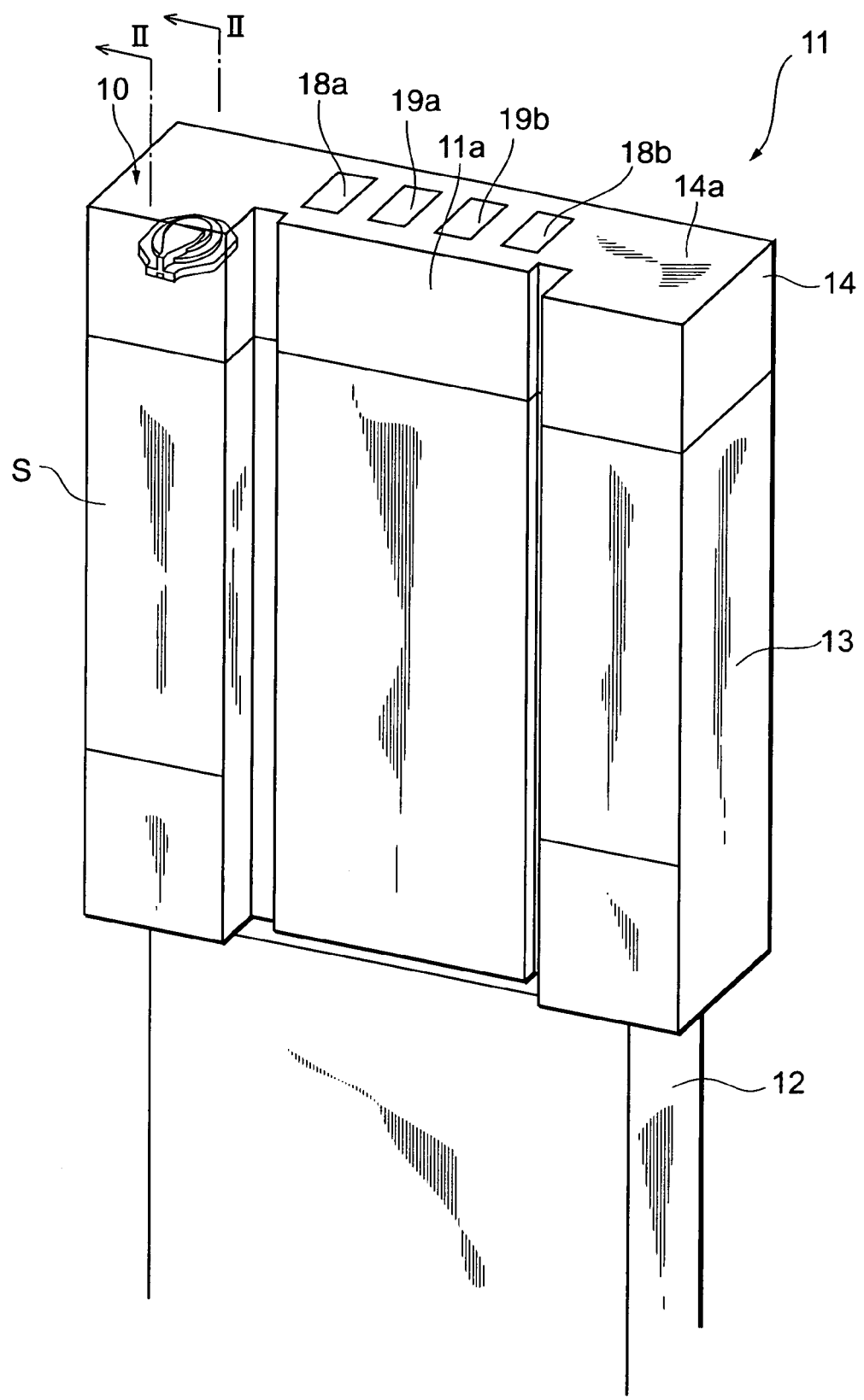
[FIG. 1]

In the following, preferred embodiments of the present invention will be explained in detail with reference to the accompanying drawings. In the explanation of the drawings, constituents identical or equivalent to each other will be referred to with numerals identical to each other without repeating their overlapping descriptions. Ratios of dimensions in the drawings do not always coincide with actual ratios of dimensions.

Magnetic Head Slider Material

First, the magnetic head slider material in accordance with an embodiment will be explained. The magnetic head slider material in accordance with this embodiment is a sintered body containing alumina ($Al_2O_3$), titanium carbide (TiC), silicon carbide (SiC), and carbon (C). In the sintered body, alumina, titanium carbide, and silicon carbide form respective crystal particles. In the sintered body, carbon is a free component chemically combined with neither alumina nor titanium carbide, and mainly exists in crystal grain boundaries of alumina and titanium carbide.

Here, the carbon content in the magnetic head slider material is 0.2 to 9 parts by weight, preferably 0.3 to 6 parts by weight, more preferably 0.5 to 3 parts by weight, when the weight of alumina is 100 parts by weight.

When the carbon content exceeds 9 parts by weight, the strength of the material tends to become too low, which is unfavorable. When the carbon content is lower than 0.2 part by weight, on the other hand, the grinding speed does not become sufficiently higher than that in the conventional AlTiC sintered body.

The AlTiC sintered body employed as a conventional magnetic head slider material is made by mixing an alumina powder and a titanium carbide powder, and sintering them. In general, the titanium carbide powder inevitably contains about 0.05 to 0.15% of carbon. The silicon carbide powder also inevitably contains about 0.05 to 0.15% of carbon in general.

The carbon content in the magnetic head slider material in accordance with this embodiment includes that derived from the titanium carbide powder and that derived from the silicon carbide powder. Assuming that the weight of alumina in the sintered body is 100 parts by weight, the conventional AlTiC sintered body usually contains about 0.05 to 0.18 part by weight of carbon. The carbon content of the conventional AlTiC sintered body is much lower than that in the magnetic head slider material in accordance with this embodiment.

The content of titanium carbide and silicon carbide in total in the magnetic head slider material in accordance with this embodiment is 20 to 150 parts by weight with respect to 100 parts by weight of alumina. Such a range yields a magnetic head substrate having a sufficient strength. When the titanium carbide content is less than 20 parts by weight, the rigidity tends to decrease, thereby lowering the strength. When the titanium carbide content exceeds 150 parts by weight, on the other hand, the sintering property tends to deteriorate, thereby lowering the strength.

The silicon carbide content in the magnetic head slider material in accordance with this embodiment is preferably 10 to 90 parts by weight, more preferably 25 to 45 parts by weight, with respect to 100 parts by weight of alumina. When the silicon carbide content is less than 10 parts by weight, a sufficient thermal conductivity is harder to attain in the material, whereby the heat dissipation property of the magnetic head slider tends to become insufficient. When the silicon carbide content exceeds 90 parts by weight, on the other hand, the thermal expansion coefficient of the material tends to decrease. If the difference in thermal expansion coefficient between the material and the thin-film part becomes remarkable, differences in level are likely to occur between the substrate and alumina undercoat film when the magnetic head is in use.

Preferably, the titanium carbide content in the magnetic head slider material in accordance with this embodiment is at least 35 parts by weight with respect to 100 parts by weight of alumina. This allows the material to improve its electric resistance, thereby making it easier to attain the antistatic effect.

Preferably, the magnetic head slider material further contains titania. A preferred titania content is 0.5 to 10 parts by weight with respect to 100 parts by weight of alumina. Containing titania allows the sintered body to improve its sintering property, and makes it easier to enhance the strength.

The magnetic head slider material may contain other components to such an extent that they do not affect characteristics.

Method of Manufacturing Magnetic Head Slider

A first method of manufacturing such a magnetic head slider material will now be explained.

First, an alumina powder, a titanium carbide powder, a silicon carbide powder, a carbon powder, and a titania powder which is an additive employed when necessary are prepared.

The average particle size of the alumina powder in the material is preferably 0.1 to 1 µm, more preferably 0.4 to 0.6 µm.

The average particle size of the titanium carbide powder is preferably 0.1 to 3 µm, more preferably 0.5 to 1.5 µm. The titanium carbide powder may contain carbon.

The average particle size of the silicon carbide powder is preferably 0.03 to 1 µm, more preferably 0.05 to 0.5 µm. The titanium carbide powder may contain carbon.

The average particle size of the carbon powder is preferably 20 to 100 nm. For example, powders made of carbon such as carbon black and ethylene black can be used as the carbon powder.

The average particle size of the titania powder is preferably 0.1 to 3 µm, more preferably 0.5 to 1 µm.

These powders are mixed in an organic solvent such as ethanol, IPA, or 95% denatured ethanol, so as to yield a mixed powder. If water is used as a solvent, it will chemically react with titanium carbide, thereby oxidizing the titanium carbide powder. Hence, water cannot be used.

The alumina powder, titanium carbide powder, silicon carbide powder, carbon powder, and titania powder are compounded such that respective weights of the titanium carbide powder, silicon carbide powder, carbon, and titania satisfy their corresponding conditions mentioned above when the total weight of alumina is 100 parts by weight.

Preferably, the mixing of powders is performed in a ball mill or attritor. Preferably, the mixing of powders is carried out for about 10 to 100 hours. As a mixing medium in the ball mill or attritor, alumina balls each having a diameter of about 1 to 20 mm, for example, are preferably used.

Next, the mixed powder is granulated by spraying. It will be sufficient if the mixed powder is spray-dried in a warm current of an inert gas such as nitrogen or argon substantially free of oxygen at a temperature of about 60 to 200° C., for example. This yields a granulated product of the mixed powder having the composition mentioned above. The particle size of the granulated product is preferably about 50 to 200 µm, for example.

As necessary, the above-mentioned organic solvent is added to the granulated product, so as to regulate the liquid content therein such that about 0.1 to 10 weight % of the organic solvent is contained in the granulated product. Examples of the organic solvent used for regulating the liquid content include organic solvents such as ethanol, IPA, and 95% denatured ethanol. The organic solvent used at the time of mixing the powders is usually employed here as well. If water is employed as a solvent here, the solvent will react with titanium carbide, thereby oxidizing the titanium carbide powder. Hence, water cannot be used here, either.

Subsequently, a predetermined mold is filled with the granulated product, and primary molding is performed by cold pressing, so as to yield a molded body. For example, it will be sufficient if a mold made of a metal or carbon for forming a disk having an inner diameter of 150 mm is filled with the granulated product and is cold-pressed at a pressure of about 5 to 15 MPa (about 50 to 150 kgf/cm$^2$).

Then, the resulting molded body is hot-pressed, so as to yield a sintered body. For example, the sintering temperature is 1200 to 1700° C., the pressure is 10 to 50 MPa (about 100 to 500 kgf/cm$^2$), and the atmosphere is a non-oxidizing atmosphere such as vacuum, nitrogen, or argon. The non-oxidizing atmosphere is used for restraining titanium carbide from oxidizing. Preferably, a mold made of carbon is used for molding the mixed powder. It will be preferred if the sintering time for the molded body is about 1 to 3 hours.

This completes the magnetic head slider material. The form of the magnetic head slider material is not restricted in particular, and may be a disk-shaped substrate having a diameter of 6 inches with a thickness of 2.5 mm, or a rectangular substrate, for example.

A second method of manufacturing such a magnetic head slider material will now be explained.

The second manufacturing method employs an organic matter in place of the carbon powder used in the above-mentioned first manufacturing method. First, specifically, an aluminum powder, a titanium carbide powder, a silicon carbide powder, and the organic matter are mixed, so as to yield a mixture. Though not restricted in particular, examples of the organic matter include polyvinyl alcohol, acrylic resin, and butyral resin. Additives such as titania powder may be added to the mixture as necessary.

Subsequently, the mixture is heat-treated in a non-oxidizing atmosphere such as vacuum or nitrogen atmosphere, so as to carbonize the organic matter in the mixture. The carbonizing condition can favorably be set as appropriate depending on species of the organic matter or the like. For example, heat treatment at 600° C. for about 5 hours in a vacuum dryer or the like can yield a mixed powder containing alumina, titanium carbide, silicon carbide, carbon, and titania or the like added if necessary.

Thereafter, it will be sufficient if the mixed powder is molded and sintered as in the first manufacturing method.

When the material is manufactured with the organic matter as such, carbon can be dispersed uniformly, whereby the time required for dispersing carbon can be shortened.

Though it is preferable for the organic matter to be carbonized before molding as mentioned above in order to yield a dense magnetic head slider material, the organic matter may be carbonized after molding.

Specifically, after a mixture containing the alumina powder, titanium carbide powder, silicon carbide powder, organic matter, and the like is obtained, this mixture is molded as in the first manufacturing method before being carbonized. Then, the molded body of the mixture containing the organic matter can be subjected to heat treatment as mentioned above, so as to carbonize the organic matter, thereby yielding a molded body containing alumina, titanium carbide, silicon carbide, carbon, and the like.

In the second manufacturing method, it will be sufficient if the respective contents of powders when mixing the alumina powder, titanium carbide powder, silicon carbide powder, organic matter, and titania powder or the like added as necessary are set beforehand such that respective amounts of alumina, titanium carbide, silicon carbide, carbon, and titania in the mixed powder after carbonizing their mixture or in the molded body become their corresponding contents defined in the first manufacturing method. This yields a molded body having the same composition as in the first manufacturing method.

Magnetic Head Slider

A magnetic head slider using the magnetic head slider material will now be explained with reference to FIG. 1.

The magnetic head slider 11 in accordance with this embodiment includes a thin-film magnetic head 10, and is mounted to a hard disk drive (not depicted) equipped with a hard disk. The hard disk drive is configured such that the thin-film magnetic head 10 records/reproduces magnetic information onto/from a recording surface of the hard disk rotating at a high speed.

The magnetic head slider 11 in accordance with this embodiment of the present invention has a substantially rectangular parallelepiped form. In FIG. 1, the front-side face of the magnetic head slider 11 is a recording-medium-opposing surface disposed so as to oppose the recording surface of the hard disk, and is referred to as air bearing surface (ABS) S. The air bearing surface is formed with a groove 11a extending in a direction orthogonal to the track width.

When the hard disk rotates, the magnetic head slider 11 floats up because of an airflow accompanying the rotation, whereby the air bearing surface S is separated from the recording surface of the hard disk. The air bearing surface S may be provided with a coating such as DLC (Diamond-Like Carbon).

The magnetic head slider 11 comprises a substrate 13 made of the above-mentioned magnetic head slide material; and a laminate 14, formed on the substrate 13, including the thin-film magnetic head 10. More specifically, in this embodiment, the substrate 13 has a rectangular parallelepiped form, whereas the laminate 14 is formed on a side face of the substrate 13.

The laminate 14 has an upper face 14a forming an end face of the magnetic head slider 11, whereas recording pads 18a, 18b and reproducing pads 19a, 19b connected to the thin-film magnetic head 10 are attached to the upper face 14a of the laminate 14. The thin-film magnetic head 10 is disposed within the laminate 14, while being partly exposed at the air bearing surface S to the outside. In FIG. 1, the thin-film magnetic head 10 buried within the laminate 14 is illustrated with solid lines for making it easier to discern.

Such a magnetic head slider 11 is mounted on a gimbal 12, and is connected to a suspension arm which is not depicted, so as to construct a head gimbal assembly.

Figure 2:
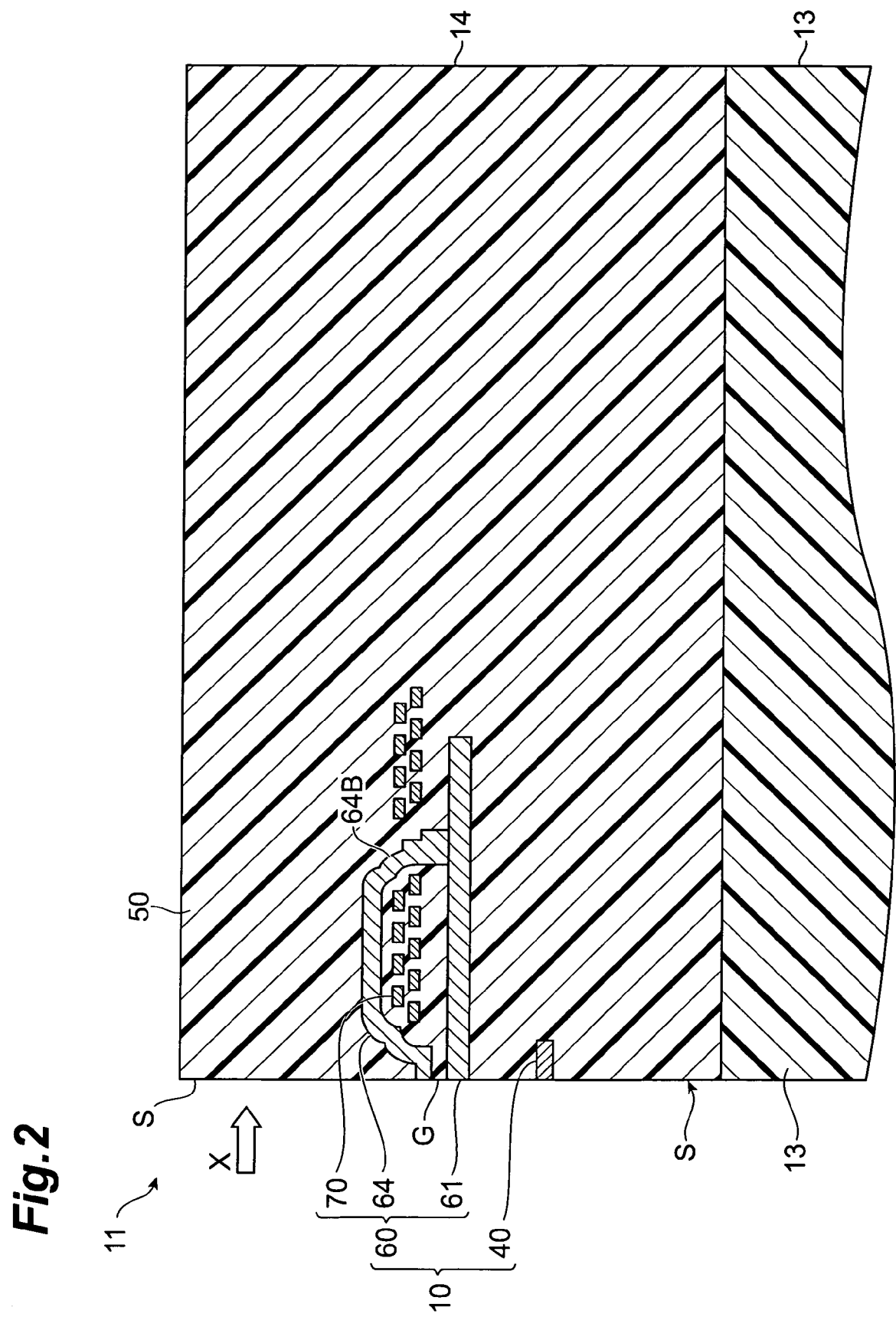
[FIG. 2]

FIG. 2 is a schematic sectional view of the magnetic head slider 11 (taken along the line II-II of FIG. 1) in a direction perpendicular to both of the air bearing surface S and the track width. As mentioned above, the magnetic head slider 11 comprises the substantially rectangular plate-like substrate 13 and the laminate 14 stacked on a side face of the substrate 13. The laminate 14 comprises the thin-film magnetic head 10 and a coating layer 50 surrounding the thin-film magnetic head 10.

The thin-film magnetic head 10 comprises, successively from the side closer to the substrate 13, a GMR (Giant MagnetoResistive) device 40 acting as a reading device for reading magnetic information from the hard disk, and an inductive electromagnetic transducer 60 acting as a writing device for writing magnetic information onto the hard disk, and thus is a so-called combination thin-film magnetic head.

The electromagnetic transducer 60, which employs a so-called in-plane recording scheme, comprises a lower magnetic pole 61 and an upper magnetic pole 64 successively from the substrate 13 side, and further comprises a thin-film coil 70.

Respective end parts of the lower magnetic pole 61 and upper magnetic pole 64 on the air bearing surface S side are exposed at the air bearing surface S, whereas the respective exposed parts of the lower magnetic pole 61 and upper magnetic pole 64 are separated from each other by a predetermined distance, so as to yield a recording gap G. On the other hand, the end part 64B of the upper magnetic pole 64 on the side remote from the air bearing surface S is bent toward the lower magnetic pole 61, and is magnetically connected to the end part of the lower magnetic pole 61 on the side remote from the air bearing surface S. As a consequence, the upper magnetic pole 64 and the lower magnetic pole 61 form a magnetic circuit interposed with the gap G.

The thin-film coil 70 is arranged so as to surround the end part 64B of the upper magnetic pole 64, and generates a magnetic field by electromagnetic induction, thereby recording magnetic information onto the recording surface of the hard disk.

The GMR device 40 is exposed at the air bearing surface S while having a multilayer structure which is not depicted, and utilizes a magnetoresistive effect, so as to detect changes in the magnetic field from the hard disk, thereby reading the magnetic information.

The insulative coating layer 50 separates the GMR device 40 and the electromagnetic transducer 60 from each other, and the upper magnetic pole 64 and lower magnetic pole 61 from each other. Except for the air bearing surface S, the thin-film magnetic head 10 itself is covered with the coating layer 50. The coating layer 50 is mainly formed by an insulating material such as alumina. Specifically, an alumina layer formed by sputtering or the like is used in general. Such an alumina layer usually has an amorphous structure.

The thin-film magnetic head 10 may employ a perpendicular recording scheme instead of the in-plane recording scheme. In place of the GMR device 40, AMR (Anisotropic MagnetoResistive) devices utilizing anisotropic magnetoresistive effects, TMR (Tunnel-type MagnetoResistive) devices utilizing magnetoresistive effects occurring in tunnel junctions, and the like may be employed.

The coating layer 50 may further contain a magnetic layer or the like for magnetically insulating the GMR device 40 and the electromagnetic transducer 60 from each other.

A method of manufacturing the foregoing magnetic head slider 11 will now be explained.

Figure 3:
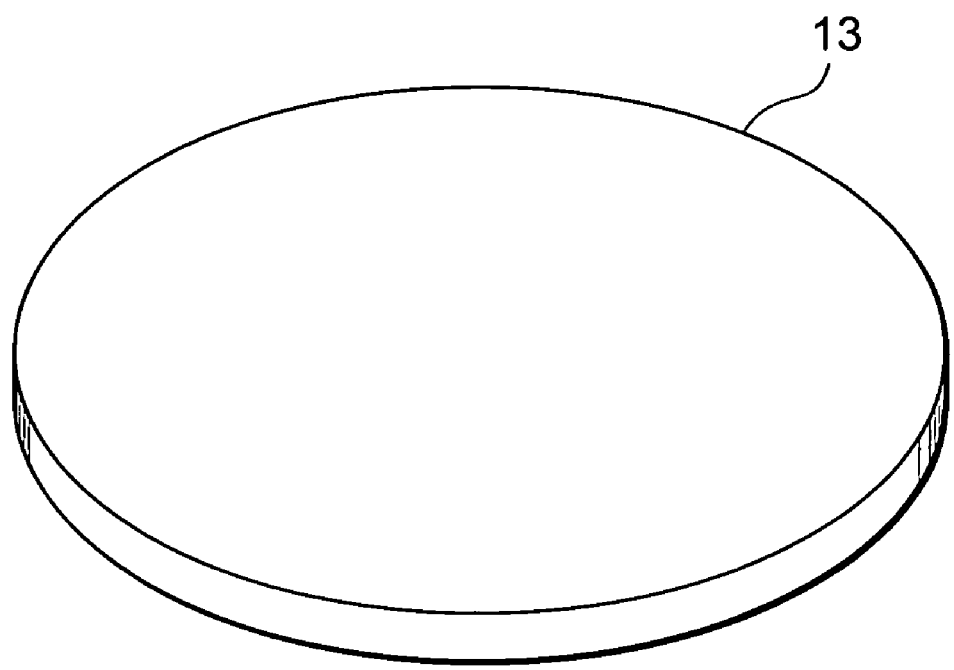
[FIG. 3]

First, as shown in FIG. 3, a substrate 13 formed like a disk-shaped wafer from the above-mentioned magnetic head slider material is prepared as mentioned above. Next, as shown in (a) of FIG. 4, a laminate 14 including a thin-film magnetic head 10 and a coating layer 50 is stacked on the substrate 13 by a known technique. Here, the laminate 14 is formed such that a number of thin-film magnetic heads 10 are arranged in a matrix in the laminate 14.

Subsequently, the laminate 14 is cut into predetermined forms and sizes. For example, the laminate 14 is cut as illustrated with dotted lines in (a) of FIG. 4, whereby bars 100B each comprising a plurality of magnetic heads 10 arranged in a row and exposed at a side face 100BS are formed as shown in (b) of FIG. 4.

Then, a so-called lapping step for grinding the side face 100BS of the bar 100B so as to form an air bearing surface S is performed. In the lapping step, the substrate 13 and the laminate 14 stacked thereon are simultaneously ground in a direction (of arrow X in FIG. 2) intersecting the laminating direction.

In this embodiment, the substrate 13 is made of the above-mentioned magnetic head slider material, i.e., a sintered body containing alumina, titanium carbide, silicon carbide, and carbon which are compounded at predetermined concentrations. Therefore, the grinding speed of the substrate 13 is sufficiently higher than that of the substrate made of the conventional AlTiC sintered body, and thus is on a par with the grinding speed of the laminate 14 including the thin-film magnetic head 10.

Figure 5:
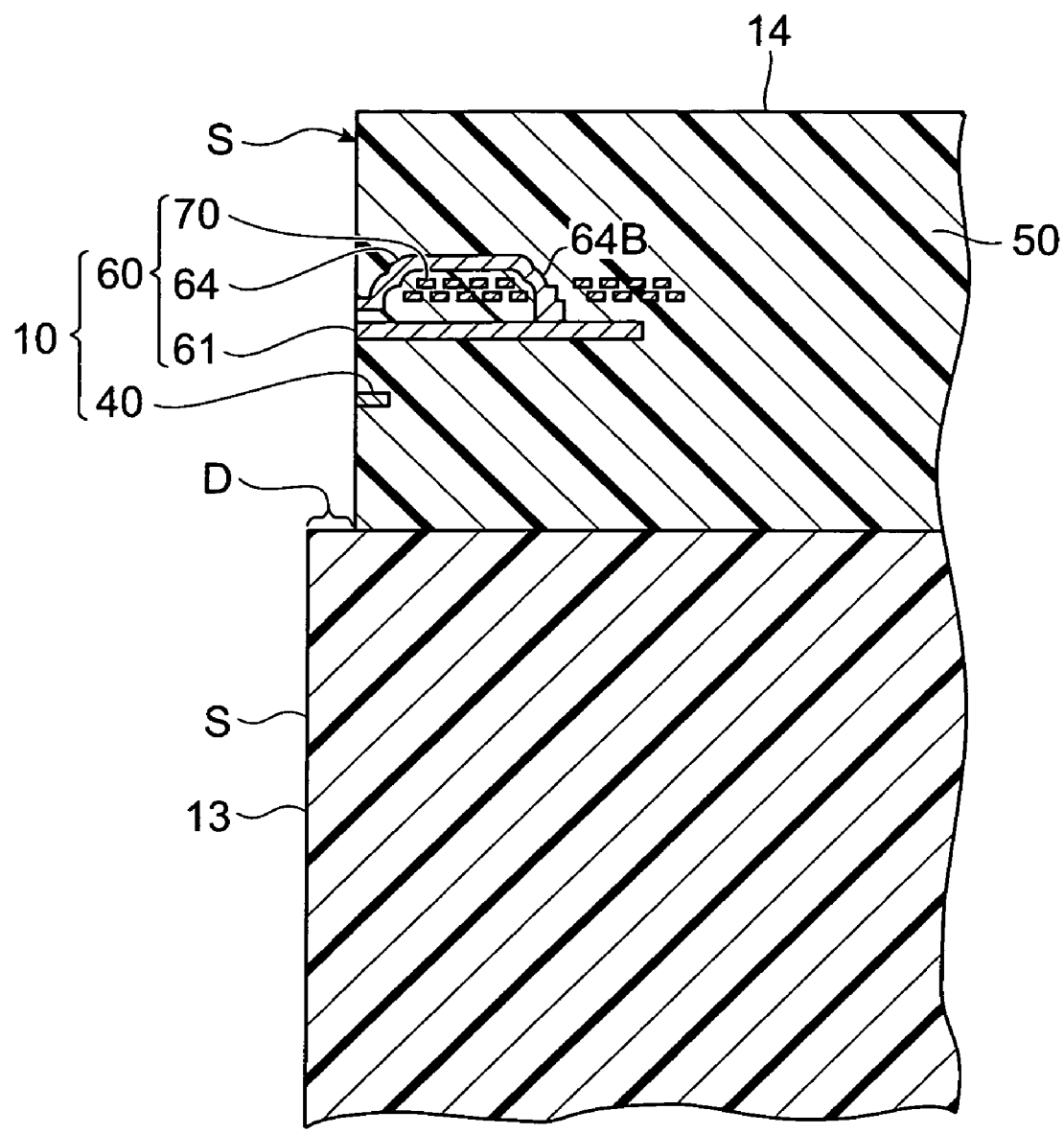
[FIG. 5]

Therefore, at the time of lapping, the difference in grinding amount between the laminate 14 and substrate 13 becomes quite small, whereby the difference in level D (see FIG. 5) between the laminate 14 and substrate 13 becomes much smaller than the conventional one. This can make the air bearing surface S attain a substantially flat state, for example. Specifically, the difference in level D can be reduced to 1.2 nm or less, for example.

Hence, the femto slider and sliders having smaller sizes can be produced favorably, and recording with a higher density can be achieved easily. Also, the substrate 13 in this embodiment has a sufficient strength and heat dissipation property, and thus is fully reliable.

EXAMPLES

In the following, the present invention will be explained in more detail with reference to examples and comparative examples, which do not restrict the present invention at all.

In these examples, a plurality of substrates for magnetic head slider materials having constituent materials different from each other were manufactured, whereas transverse strength, grinding speed, thermal conductivity, linear expansion coefficient, and electric resistance were measured in each substrate.

Examples 1 to 6

First, predetermined amounts of alumina powder (having an average particle size of 0.5 μm), titanium carbide powder (having an average particle size of 0.5 μm and containing 0.1 weight % of carbon), silicon carbide powder (having an average particle size of 0.4 μm and containing 0.1 weight % of carbon), titania powder (having an average particle size of 0.1 μm), and carbon powder (carbon black having an average particle size of 35 nm) were weighed, pulverized and mixed with IPA (isopropyl alcohol having a boiling point of 82.4° C.) for 30 minutes in a ball mill and then granulated by spraying within nitrogen at 150° C., so as to yield a granulated product.

Here, the alumina powder, titanium carbide powder, silicon carbide powder, carbon powder, and titania powder were mixed at such concentrations as to satisfy the following conditions in the granulated product.

In Examples 1 to 3, the titanium carbide, silicon carbide, and titania contents were held constant with respect to alumina, such that titanium carbide, silicon carbide, and titania were 45.41 parts by weight, 36.36 parts by weight, and 5.05 parts by weight, respectively, when the weight of alumina was 100 parts by weight. Assuming that the weight of alumina was 100 parts by weight, the weight of carbon was 1.86 parts by weight in Example 1, 5.50 parts by weight in Example 2, and 8.23 parts by weight in Example 3. In Example 4, with respect to 100 parts by weight of alumina, titanium carbide was 36.73 parts by weight, silicon carbide was 10.29 parts by weight, titania was 4.09 parts by weight, and carbon was 1.51 parts by weight. In Example 5, with respect to 100 parts by weight of alumina, titanium carbide was 62.44 parts by weight, silicon carbide was 87.50 parts by weight, titania was 6.95 parts by weight, and carbon was 2.56 parts by weight. In Example 6, with respect to 100 parts by weight of alumina, titanium carbide was 33.30 parts by weight silicon carbide was 33.33 parts by weight, titania was 4.63 parts by weight, and carbon was 1.70 parts by weight. The carbon weight was the total of the weight derived from the carbon powder, the weight derived from the titanium carbide powder, and the weight derived from the silicon carbide powder.

Subsequently, thus obtained granulated products were primarily molded at a pressure of about 0.5 MPa (50 kgf/cm$^2$), and then was fired by hot-pressing in a vacuum atmosphere for 1 hour at a sintering temperature of 1600° C. with a pressing pressure of about 30 MPa (about 300 kgf/cm$^2$), so as to yield respective magnetic head slider materials for the examples. Thereafter, each material was cut into pieces each having a size on the order of 20×20×1.8 mm. Using a slurry containing diamond particles having a diameter of 0.1 μm, each piece was ground with a single-sided grinder. The grinding condition was such that the tin plate rotating speed was 37.5 rpm, the load was 2550 g, the Oscar motor rotating speed was 55 rpm, and the grinding time was 10 minutes. The thickness of each piece was measured before and after grinding, and the change in thickness was divided by the grinding time, whereby the grinding speed was acquired in each example. The grinding speed was standardized while taking the value of Comparative Example 2 in the following as 100, and was indicated by %. Also, using a tester manufactured by Shimadzu Corporation, the transverse strength of each substrate was measured under the condition of JIS R1601 (1995). The thermal conductivity of each substrate was measured according to JIS R1611 (1991, 1997). The thermal expansion coefficient (linear expansion coefficient) of each substrate was measured according to JIS R1618 (1994). The electric resistance of each substrate was measured according to JIS R1637 (1998). Table 1 shows thus obtained results.

[Table 1]

titania was 6.70 parts by weight, and carbon was 0.06 part by weight with respect to 100 parts by weight of alumina, whereby a substrate was made. In Comparative Example 3, though a magnetic head slider material was supposed to be manufactured as in Examples except that, without adding titania, titanium carbide was 71.43 parts by weight, silicon carbide was 114.29 parts by weight, and carbon was 1.50 parts by weight with respect to 100 parts by weight of alumina, no sintered body was obtained. In Comparative Example 4, a magnetic head slider material was manufactured as in Examples except that, without adding titania, titanium carbide was 5.56 parts by weight, silicon carbide was 5.56 parts by weight, and carbon was 0.56 part by weight with respect to 100 parts by weight of alumina, whereby a substrate was made.

The grinding speed in each of the magnetic head sliders obtained, and the transverse strength, linear expansion coefficient, and electric resistance in each of the substrates obtained were measured as in Examples. Table 1 shows the results of measurement.

As shown in Table 1, it was verified that each of the magnetic head slider materials in accordance with Examples 1 to 6 yielded a grinding speed sufficiently higher than that of Comparative Example 2 made from the conventional AlTiC sintered body. Also, each of the substrates of the magnetic head slider materials of Examples 1 to 6 was seen to have a thermal conductivity exceeding 23 Wm$^{-1}$K$^{-1}$ and a linear expansion coefficient falling within the range of 6 to 8 ppm.deg$^{-1}$. Further, each of the substrates of the magnetic head slider materials in accordance with Examples 1 to 6 was seen to have an electric resistance lower than 10$^6$ Ω.cm (10$^9$ mΩ.cm). On the other hand, the magnetic head slider

TABLE 1

| | ALUMINA (pbw) | TITANIUM CARBIDE (pbw) | SILICON CARBIDE (pbw) | FREE CARBON (pbw) | TITANIA (pbw) | TRANSVERSE STRENGTH (MPa) | GRINDING SPEED (% vs COMPARATIVE EXAMPLE 2) | THERMAL CONDUCTIVITY (Wm$^{-1}$K$^{-1}$) | LINEAR EXPANSION COEFFICIENT (ppm · deg$^{-1}$) | ELECTRIC RESISTANCE (mΩ · cm) |
|---|---|---|---|---|---|---|---|---|---|---|
| EXAMPLE 1 | 100.00 | 45.41 | 36.36 | 1.86 | 5.05 | 500 | 150 | 26.0 | 6.5 | 2.5 |
| EXAMPLE 2 | 100.00 | 45.41 | 36.36 | 5.50 | 5.05 | 440 | 290 | 25.6 | 6.4 | 2.5 |
| EXAMPLE 3 | 100.00 | 45.41 | 36.36 | 8.23 | 5.05 | 400 | 380 | 25.3 | 6.4 | 2.5 |
| EXAMPLE 4 | 100.00 | 36.73 | 10.29 | 1.51 | 4.09 | 400 | 130 | 24.0 | 7.1 | 4 |
| EXAMPLE 5 | 100.00 | 62.44 | 87.50 | 2.56 | 6.95 | 460 | 130 | 30.5 | 6.0 | 1.5 |
| EXAMPLE 6 | 100.00 | 33.30 | 33.33 | 1.70 | 4.63 | 470 | 140 | 26.4 | 6.5 | 1 × 10$^8$ |
| COMPARATIVE EXAMPLE 1 | 100.00 | 41.63 | 33.33 | 0.04 | 4.63 | 630 | 90 | 26.3 | 6.6 | 2.5 |
| COMPARATIVE EXAMPLE 2 | 100.00 | 60.00 | 0.00 | 0.06 | 6.70 | 660 | 100 | 22.6 | 7.3 | 1.9 |
| COMPARATIVE EXAMPLE 3 | 100.00 | 71.43 | 114.29 | 1.50 | 0.00 | NOT MEASURABLE | NOT MEASURABLE | NOT MEASURABLE | NOT MEASURABLE | NOT MEASURABLE |
| COMPARATIVE EXAMPLE 4 | 100.00 | 5.56 | 5.56 | 0.56 | 0.00 | 380 | 60 | 30.0 | 7.0 | >10$^{10}$ |

Comparative Examples 1 to 4

In Comparative Example 1, a magnetic head slider material was manufactured as in Examples except that titanium carbide was 41.63 parts by weight, silicon carbide was 33.33 parts by weight, titania was 4.63 parts by weight, and carbon was 0.04 part by weight with respect to 100 parts by weight of alumina, whereby a substrate was made. In Comparative Example 2, a magnetic head slider material was manufactured as in Examples except that, without adding the silicon carbide powder, titanium carbide was 60.00 parts by weight, materials of Comparative Examples 1 and 2 in which the carbon content was less than 0.2 part by weight failed to yield a sufficiently high grinding speed. Further, the substrate of the magnetic head slider material of Comparative Example 2 containing no silicon carbide exhibited a thermal conductivity lower than 23 Wm$^{-1}$K$^{-1}$ and thus was insufficient in terms of thermal conductivity. Comparative Example 3 in which the content of titanium carbide and silicon carbide in total exceeded 150 parts by weight failed to yield a sintered body. Comparative Example 4 in which the content of titanium carbide and silicon carbide in total was less than 20 parts by weight was insufficient in terms of grinding speed, transverse strength, and electric resistance.

EFFECTS OF THE INVENTION

The present invention can realize a magnetic head slider which has reduced differences in level in the air bearing surface while having a sufficient strength. This can manufacture a magnetic head slider having a smaller size, thereby enabling a higher density. Further, a magnetic head slider having an excellent heat dissipation property can be realized, whereby a high reliability can be obtained.

What is claimed is:

1. A magnetic head slider material constituted by a sintered body containing 100 parts by weight of alumina, 20 to 150 parts by weight of titanium carbide and silicon carbide in total, and 0.2 to 9 parts by weight of carbon.

2. The magnetic head slider material according to claim 1, wherein the sintered body contains 0.3 to 6 parts by weight of carbon with respect to 100 parts by weight of alumina.

3. The magnetic head slider material according to claim 1, wherein the sintered body contains 0.5 to 3 parts by weight of carbon with respect to 100 parts by weight of alumina.

4. The magnetic head slider material according to claim 1, wherein the sintered body contains 10 to 90 parts by weight of silicon carbide with respect to 100 parts by weight of alumina.

5. The magnetic head slider material according to claim 1, wherein the sintered body contains at least 35 parts by weight of titanium carbide with respect to 100 parts by weight of alumina.

6. A magnetic head slider comprising a substrate made of a sintered body; and a laminate, formed on the substrate, including a thin-film magnetic head;
wherein the sintered body contains 100 parts by weight of alumina, 20 to 150 parts by weight of titanium carbide and silicon carbide in total, and 0.2 to 9 parts by weight of carbon.

7. The magnetic head slider according to claim 6, wherein the sintered body contains 0.3 to 6 parts by weight of carbon with respect to 100 parts by weight of alumina.

8. The magnetic head slider according to claim 6, wherein the sintered body contains 0.5 to 3 parts by weight of carbon with respect to 100 parts by weight of alumina.

9. The magnetic head slider according to claim 6, wherein the sintered body contains 10 to 90 parts by weight of silicon carbide with respect to 100 parts by weight of alumina.

10. The magnetic head slider according to claim 6, wherein the sintered body contains at least 35 parts by weight of titanium carbide with respect to 100 parts by weight of alumina.

11. A method of manufacturing a magnetic head slider material, the method comprising the steps of:
preparing a molded body containing 100 parts by weight of alumina, 20 to 150 parts by weight of titanium carbide and silicon carbide in total, and 0.2 to 9 parts by weight of carbon; and
sintering the molded body in a non-oxidizing atmosphere.

12. The method of manufacturing a magnetic head slider material according to claim 11, wherein the step of preparing the molded body mixes a powder containing alumina, a powder containing titanium carbide, a powder containing silicon carbide, and a powder containing carbon so as to yield a mixed powder, and molds the mixed powder.

13. The method of manufacturing a magnetic head slider material according to claim 11, wherein the step of preparing the molded body mixes a powder containing alumina, a powder containing titanium carbide, a powder containing silicon carbide, and an organic matter so as to yield a mixture, heat-treats the mixture in the non-oxidizing atmosphere so as to carbonize the organic matter in the mixture and yield a mixed powder, and molds the mixed powder.

14. The method of manufacturing a magnetic head slider material according to claim 11, wherein the step of preparing the molded body mixes a powder containing alumina, a powder containing titanium carbide, and an organic matter so as to yield a mixture, molds the mixture, and heat-treats the molded mixture in the non-oxidizing atmosphere so as to carbonize the organic matter in the mixture.

* * * * *